Figure 1:
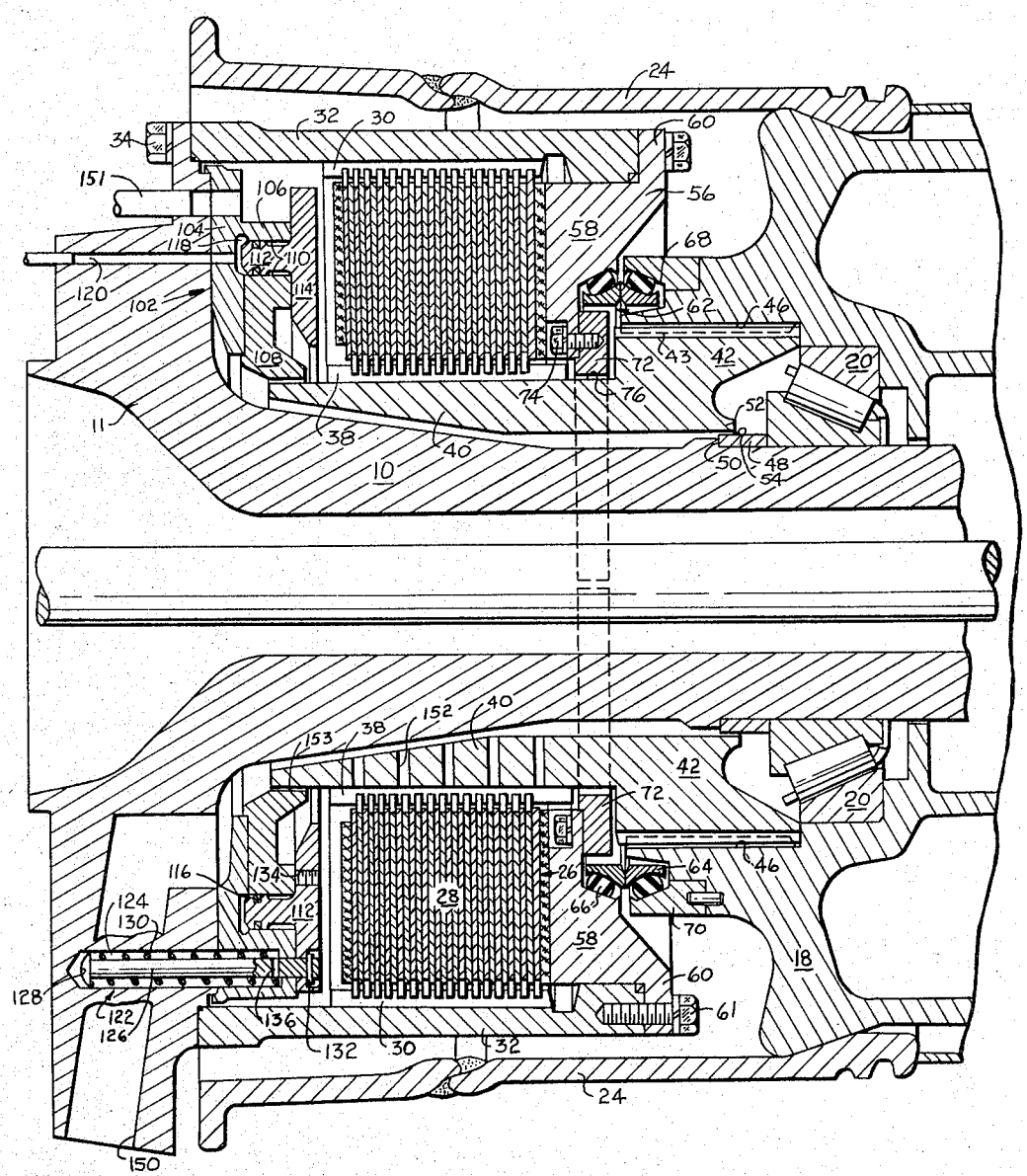

INVENTORS
CARROLL R. COLE
JACKSON C. MEDLEY
BY
ATTORNEYS

Jan. 31, 1967  C. R. COLE ETAL  3,301,359
BRAKING APPARATUS
Filed June 21, 1965  4 Sheets-Sheet 3

INVENTORS
CARROLL R. COLE
BY JACKSON C. MEDLEY

ATTORNEYS

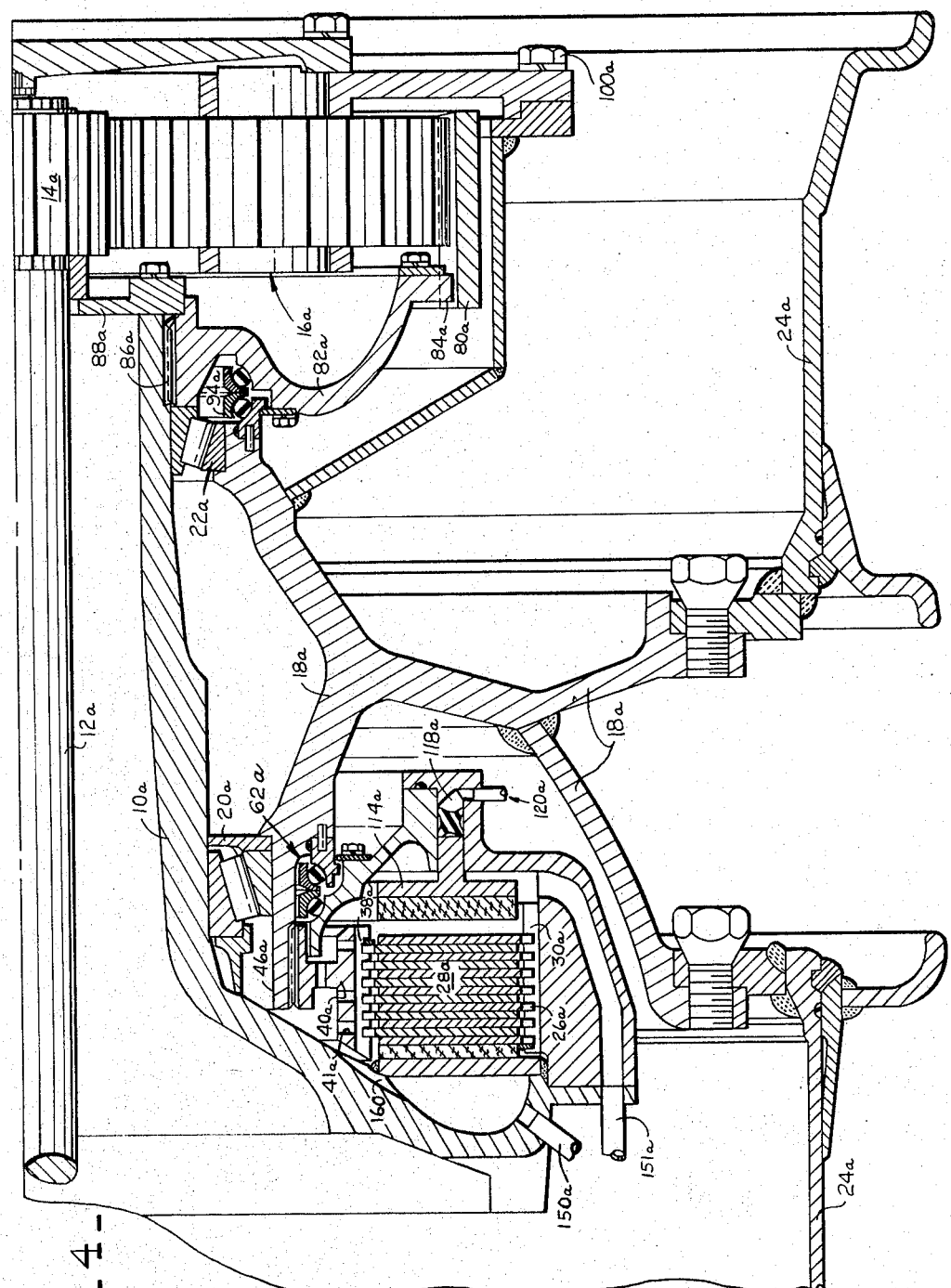

United States Patent Office 3,301,359
Patented Jan. 31, 1967

3,301,359
BRAKING APPARATUS
Carroll R. Cole, Decatur, and Jackson C. Medley, East Peoria, Ill., assignors to Caterpillar Tractor Co., Peoria, Ill., a corporation of California
Filed June 21, 1965, Ser. No. 465,493
8 Claims. (Cl. 192—4)

This invention relates to a braking apparatus and more particularly to liquid cooled multiple disc brakes.

This invention also relates to a braking apparatus being constructed and arranged to facilitate assembly and service of the various components of the brake.

The disc braking apparatus constructed according to this invention includes a conventional oil cooled disc pack, an axially adjacent wheel hub rotatably mounted, by means of longitudinally spaced bearings, on a tubular axle housing, and a final drive transmission arranged to impart rotation to the wheel hub. The disc pack, the wheel hub and the final drive are constructed so that they may be pre-assembled as sub-assemblies and joined together to constitute the entire braking apparatus. By organizing these elements in this manner, replacement or repair of the individual components can be achieved without disturbing the assembled relation of such sub-assemblies.

The bearings, rotatably mounting the wheel hub on the axle housing, are located in an annular chamber which is in communication with a chamber containing the disc pack so that the cooling oil may be employed to lubricate the bearings. Since the discs are coated with friction material, during use, particles of the friction material become separated and are entrained in the cooling oil. If such particles were to be admitted to the bearing chamber, premature failure of the bearings would occur. To avoid such an occurrence and yet employ the cooling oil for lubricating the bearing this invention incorporates means, in the form of a restriction, for preventing the entrance of the particles of friction material to the bearing chamber.

In order to provide for the retention of cooling and lubricating oil, the braking apparatus of this invention includes contacting rotary seals located at longitudinally spaced positions establishing sealing relation between the disc pack and one end of the wheel hub assembly and the final drive transmission in the other end of the wheel hub. In this manner whenever it is desired to inspect or replace the outboard seal, it is not necessary to remove the wheel bearings.

The wheel hub and the disc pack of this invention are interconnected by means of an annular member having splines formed thereon one of which receives the rotating discs of the disc pack and the other is received in a cooperating spline formed on the wheel hub. This spline member constitutes the brake hub and it is held against axial movement by means of a split ring secured to the disc pack housing. By this construction removal of the wheel hub does not disturb the assembled relation of the brake hub and the disc pack. Thus upon assembly it is merely necessary to slide the wheel hub on the spline of the brake hub.

Actuation of the brakes of this invention is accomplished by communicating pressure fluid to an annular cavity within which is mounted an annular piston including conventional sealing rings whereupon an axial force is applied to the discs. Due to the fact that the pressure fluid contains foreign material, failure of the sealing rings frequently occurs thus requiring their replacement. In avoiding this difficulty this invention provides means preferably in the form of a settling chamber, for accumulating such material and provision is made for draining the chamber.

Accordingly, it is an object of this invention to provide a new and improved braking apparatus.

Another object of this invention is to form the parts of the braking apparatus so that assembly and disassembly are easily accomplished.

Another object of this invention is to provide a braking structure in which the seals interconnecting the rotating and non-rotating parts are easily accessible when it is desired to inspect or replace the seals.

Another object of this invention is to provide an oil-cooled hydraulically actuated braking apparatus having a disc brake assembly and a planetary drive assembly which are incorporated as assembled units with an axle housing and a wheel hub.

Still another object of this invention is to prevent failure of the wheel bearings by portions of friction lining separated from the disc pack.

Another object of this invention is to construct a braking apparatus having oil-cooled disc brakes in which the oil for cooling the discs is communicated to the wheel bearings.

Another object of this invention is to prevent failure of the seals of the brake actuating piston.

Figure 2:
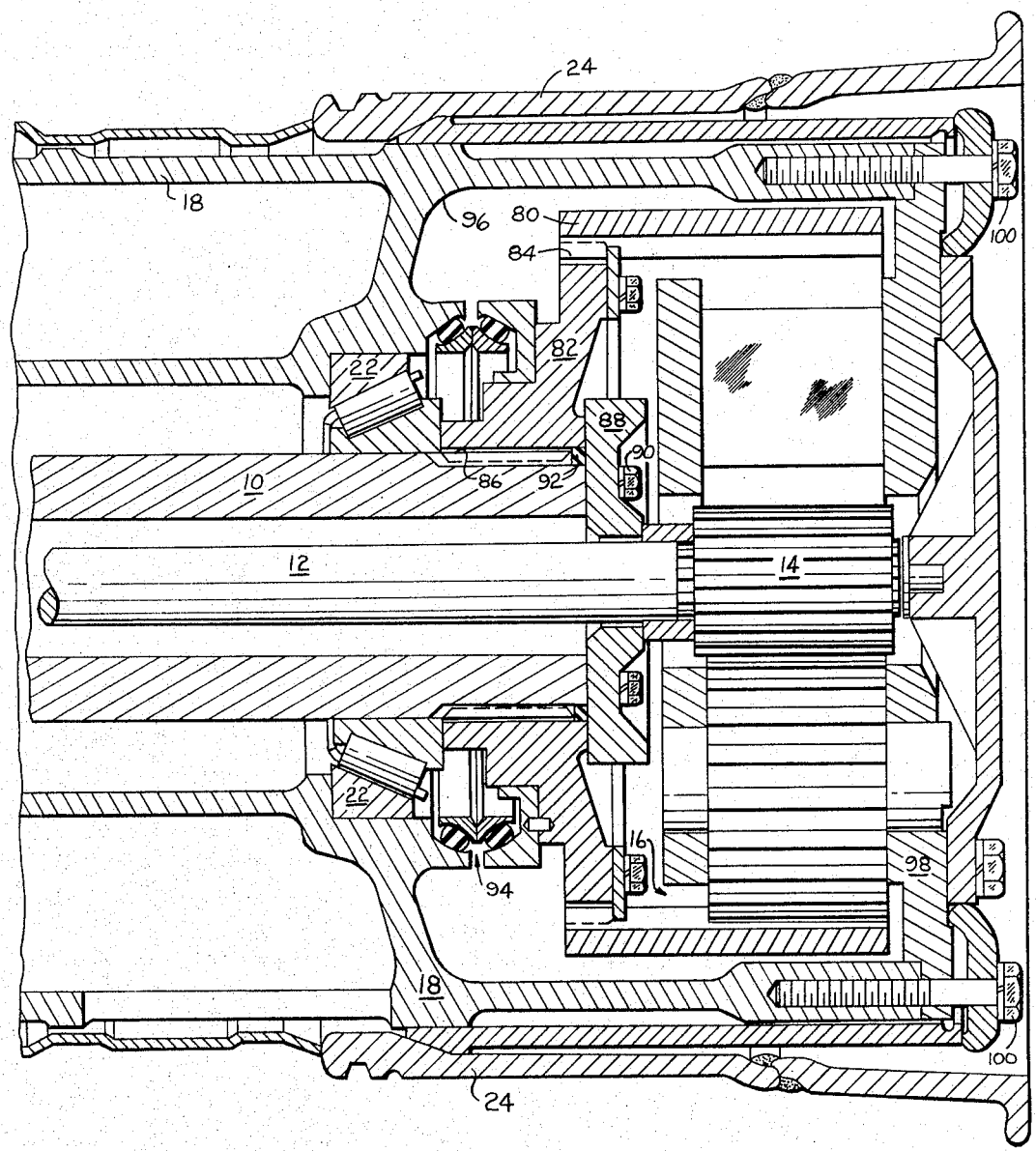
Figure 3:
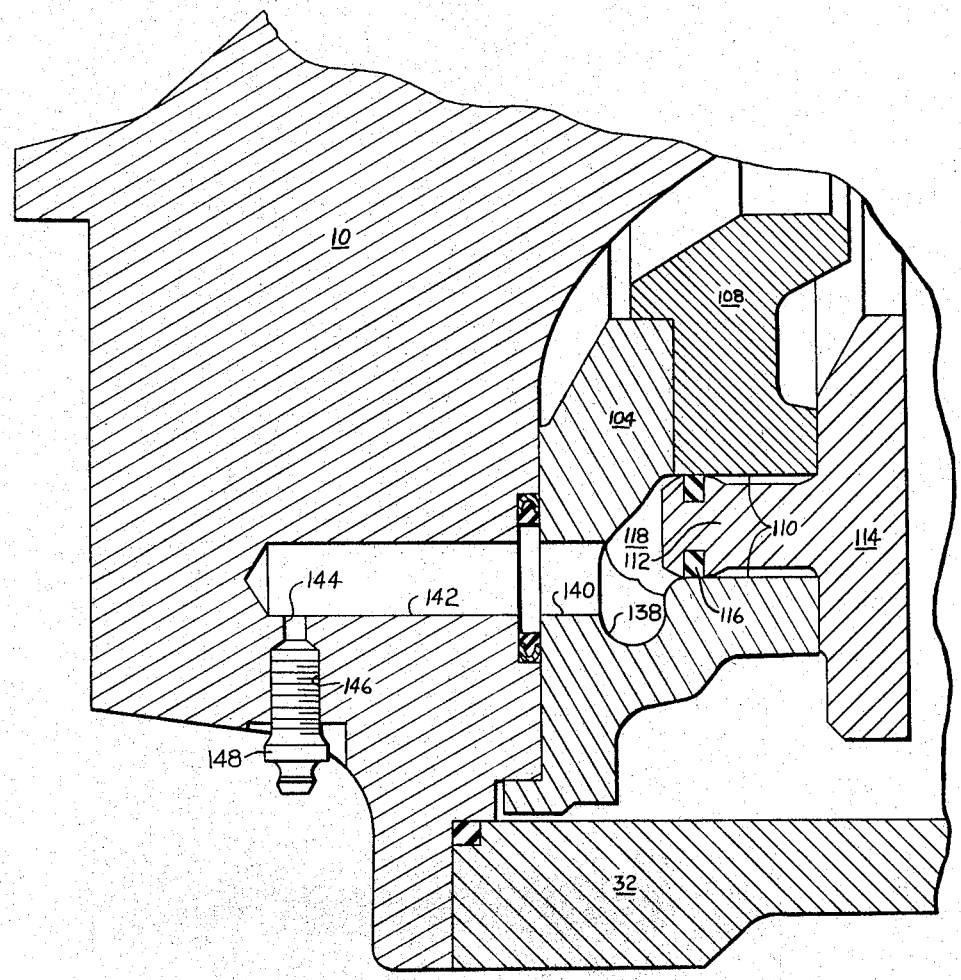

Other objects of this invention will become apparent from the following description taken in connection with the accompanying drawings in which:

FIGS. 1 and 2, considered together, show a braking apparatus constructed in accordance with the principles of this invention;

FIG. 3 is an enlarged fragmentary view of the brake actuating piston and a sump formed on the pressure side of the piston which accumulates shavings and foreign material which infiltrates the brake actuating fluid circuit; and FIG. 4 is a half-section of a fragmentary portion of a modified form of the braking apparatus shown in FIGS. 1 and 2.

The braking apparatus constructed according to the principles of this invention is shown in FIGS. 1 and 2 and includes an elongated tubular axle housing 10 formed with a flange portion 11 on the inboard end thereof and having a drive axle 12 supporting, at the outboard end thereof, a drive pinion 14 which constitutes the input to a planetary drive train 16 which is arranged to impart rotation to a wheel hub 18 supported on the axle housing 10 by longitudinally spaced bearings 20 and 22. Wheel rims 24 are rigidly secured to the wheel hub 18.

A disc brake assembly 26 including a plurality of stacked interleaved plates 28, alternate ones of which have their outer peripheries formed for reception in a spline 30 on a tubular member 32 which, by means of bolts 34, is rigidly connected to the flange portion 11. The remaining ones of the plates 28 are engaged on a spline 38 formed on an annular longitudinally extending coupling or brake hub 40. The coupling 40 includes a radially enlarged portion 42 splined at 43 for engagement with a splined bore 46 formed on the inboard end of the wheel hub 18.

In accordance with one of the features of this invention, the coupling 40 has the inner periphery thereof so formed with respect to the adjacent surface of the axle housing 10 to provide means whereby lubricating oil that is distributed to the bearings 20 and 22 is constrained to pass through a restricted passageway which is effective to block the entrance of friction material, separated from the faces of the discs 28, from being carried to the bearings with the lubricating oil. To this end a spacer ring 48 is slidably fitted on the tubular housing 10 and seated against a shoulder 50. The coupling member 40 is formed with a radially inwardly extending wall defining an adjacent portion 52 in close radial proximity to the periphery of the spacer ring 48. In this manner a restricted annular passageway 54 is defined which, as stated, is effective to block the entrance toward the bearings of friction material detached from the plates 28.

The disc brake assembly 26 includes a reaction plate 56 fitting the bore of the tubular member 32 and including inner and outer flanges 58 and 60, respectively, with the outer flange being provided with a series of circumferentially spaced holes through which bolts 61 are disposed for threaded engagement with corresponding tapped holes formed in the tubular member 32. Thus, the disc brake assembly is constructed as a self-contained unit located between the inboard flange 11 and the plate 56.

Sealing relation between the disc brake assembly 26 and the wheel hub 18 is accomplished by providing a seal 62 including similarly shaped rings 64 held in contact by elastomeric toric rings 66 seated against sloping surfaces 68 formed on the plate 56 and on a ring 70 attached to the inboard end of the wheel hub 18. By locating the seal 62 in radially spaced relationship to the coupling 40, the cooling fluid supplied to the disc brake assembly 26 can be communicated to the chambered portion of the wheel hub 18 in which the bearings 20 and 22 are located. In addition, the location of the seal 62 does not interfere with assembly and disassembly of the wheel hub 18 at the spline 43.

In order to maintain the disc brake assembly 26 in assembled relation when the wheel hub 18 is removed, the coupling 40 must be held against axial movement so that the spline 38 does not become withdrawn from the disc plates slidably fitted thereon. Accordingly, the flange 58 has a split ring 72 attached thereto by a series of circumferentially spaced bolts 74 threaded into the flange 58. The coupling is provided with a groove 76 within which the ring parts 72 extend to constitute an abutment for the spline 38 thus serving to prevent axial movement of the coupling 40.

Thus, it is seen that the form and location of the seal 62 and the split ring 72 makes it possible to assemble and disassemble the wheel hub structure 18 without disturbing the brake assembly 26.

The planetary drive train 16 is removably attached to the wheel hub 18 as a unit further contributing to the ease of assembly and disassembly of the braking apparatus of this invention. In particular the drive train 16 comprises a ring gear 80 connected to the axle housing 10 by an annular wall 82 which has its outer periphery splined at 84 to slidably engage the ring gear 80. The inner diameter of the wall 82 is splined to slidably engage a cooperating spline portion 86 formed on the end of the housing 10. A retaining plate 88 is secured by means of bolts 90 to the end of the axle housing 10 and is effective to hold the wall 82 against outward axial movement with respect to the axle housing 10. A seal 92, located at the juncture of the axle housing 10, the wall 82, and the plate 88 is provided for preventing flow of bearing lubricating oil into the drive train 16. A seal 94, substantially identical in construction to the seal 62, is located outboard (to the right as viewed in FIG. 2) from the bearing 22 and prevents the flow of lubricating oil to the chambered portion 96 of the wheel hub 18 within which the drive assembly 16 is located. The turning moment supplied to the drive assembly 16 by the pinion gear 14 is transferred to the wheel hub 18 by a planet gear carrier 98 which is fixed to the wheel hub 18 by a plurality of circumferentially spaced bolts 100.

In view of the above described construction, particularly the location of the seal 94 outboard of the bearing 22, the drive assembly 16 can be removed as a unit by merely removing the bolts 100 and and the bolts 90 permitting the plate 82 to be removed from the spline 86. With the drive assembly 16 removed, the seal 94 is completely accessible for inspection and replacement if necessary.

It is another significant feature of this invention to provide a simple and effective means for accumulating, for easy removal, shavings and foreign material introduced in the pressure fluid circuit which actuates the disc brake actuator. In addition, another feature of this invention involves providing spring powered mechanisms being operative to insure retraction of the brake actuator. The spring powered mechanisms are so arranged that the actuator housing need not be removed in the event the actuator seals are to be serviced. As shown in FIG. 1, the actuator assembly is designated by the numeral 102 and includes an actuator housing 104 having an axially projecting wall 106 and a ring member 108 extending radially inwardly from the wall 106 and attached to the housing 104. The axial confronting surfaces of the wall 106 and the member 108 define a cylinder having radially spaced axially extending surfaces 110 within which is slidably disposed an annular piston 112 formed integral with a brake actuator 114. The annular piston 112 is provided with seals 116 which prevent leakage of pressure fluid admitted to a chamber 118 by a conduit 120. In operation pressure fluid communicated to the chamber by the conduit 120 effects axial movement of the brake actuator 114 towards and into engagement with the interleaved plates 28 thus causing actuation of the disc brake assembly.

The brake actuator is disengaged from the discs 28 by a series of circumferentially spaced spring biased retracting mechanisms 122 located in bores 124 formed in the flange portion 11 and in the actuator housing 104. The retracting mechanisms 122 comprise an elongated rod 126 formed with a head 128 against which is seated one end of a helical compression spring 130 and is maintained under compression by having the other end in engagement with the bore 124. The rod 126 extends through the actuator housing and is provided with a hole for receiving a retaining pin 132 which transfers the compression of the spring 130 to the brake actuator 114.

In order to provide for diassembly of the brake actuator 114 relative to the actuator housing 104, the brake actuator is provided with a series of equally circumferentially spaced tapped holes 134 in which jack bolts (not shown) may be disposed to bear against the surface of the member 108 so that as the bolts are turned in the tapped holes 134 the brake actuator 114 is caused to move to the right (as viewed in FIG. 1) compressing the spring 130 and moving the rod 126 to the right. After the rods 126 have been withdrawn a sufficient distance outwardly to exposed a transverse hole 136 formed in each one of the rods 126, pins are inserted in the holes 136 holding the rods 126 in their withdrawn position and at this time the jack bolts are removed and the brake actuator 114 is pressed to the left exposing the retaining pins 132. With the retaining pins so exposed they are removed thus permitting the brake actuator 114 to be removed from the rods 126.

In accordance with another feature of this invention, the chamber 118 is provided with an enlargement located at its lower circumferential portion for accumulating any foreign material, introduced to the chamber 118 with the actuating oil, in order to prevent scoring of the walls 110 or destruction of the seals 116. As shown in FIG. 3, the chamber 118 includes an enlarged settling chamber 138 which communicates with axially aligned bores 140 and 142 formed in the actuator housing 104 and in the axle housing 10, respectively. A small passageway 144 communicates the bore 142 with a threaded port 146 in which a drain plug 148 is threaddedly disposed. Accordingly, foreign particles settling in the enlarged portion 138 are removed by merely removing the plug 148.

Oil for cooling the disk brake assembly 26 and for lubricating the bearings 20 and 22 is introduced into the braking apparatus by a passageway 150 which discharges cooling and lubricating fluid to the interior of the tubular member 32 where it traverses the brake discs by infiltrating through the splines 30 and 38 and across the radial faces of the discs 28. This oil flows through a series of radial holes 152 (only a portion of which are shown), formed in the coupling 40, through the space defined by the axle housing 10 and the coupling member 40, and through the annular restriction 54 which, as stated above, prevents entrance of detached friction material from the discs 28 into the area of the bearings 20 and 22. The oil is returned to the source of by a conduit 151.

Even distribution of cooling oil between the adjacent discs 28 is provided for by the holes 152. To insure that the major portion of the oil from supply passage 150 is directed to the holes 152, the ring member 108 extends radially inwardly terminating in close adjacency to the hub 40 thereby defining a narrow passage 153 which limits flow of cooling oil to the discs 28 from this area.

The modification shown in FIG. 4 has the axle housing and the wheel hub related with each other to permit assembly and disassembly of the planetary drive train and the disk brake assembly without disturbing the disc pack.

As shown in FIG. 4 wherein like numeral designations followed by the letter "a" refer to corresponding structure shown in FIGS. 1 and 2, this modification comprises an axle housing 10a through which is disposed a drive shaft 12a on the end of which is secured a drive pinion 14a constituting the input to the planetary drive train 16a. A wheel hub 18a is supported for rotation on the axle housing 10a by means of tapered roller bearings 20a and 22a and the wheel hub has detachably secured thereto wheel rims 24a. A disc brake assembly 26a includes interleaved discs 28a of which alternate ones engage a spline 30a and the remaining ones engaged with a spline 38a formed on a coupling 40a which is connected by means of another spline 46a to the wheel hub 18a.

As in the preferred embodiment, the disc brake assembly 26a is oil cooled and the oil is utilized to lubricate the bearings 20a and 22a. Sealing devices 62a and 94a, of the same type mentioned herein above, are provided in this embodiment and they are so located to facilitate their inspection and replacement without completely disassembling the drive assembly 16a or the brake actuating asembly 26a. As shown in FIG. 4, the inboard seal 62a is located to permit the wheel hub 18a to be moved axially to the right out of engagement with the spline 46a without disturbing the disc brake assembly 26a. In the event it is desired to replace or inspect the seal 62a or the bearing 20a, it is easily accomplished in this manner. The feature holds true for the seal 94a.

The planetary drive train 16a is connected to the axle housing 10a by the annular wall 82a splined to the axle housing at 86a and to the ring gear 80a at 84a and is held against axial movement with respect to the axle housing 10a by an annular plate 88a bolted to the end of the axle housing 10a and partially overlapping the inner end of the plate 82a. The seal 94a is located outboard of the bearing 22a and is effective to preclude leakage of lubricating oil from the bearing cavity. Thus in the event it is desired to inspect or replace the seal 94a, it is merely necessary to remove the plate 88a and bolts 100a securing the planetary gear carrier to the wheel hub 18a thus permitting the planetary drive assembly 16a to be removed from the spline 86a. Thus, of course, exposes the seal 94a and its replacement can be easily accomplished without disturbing the remaining parts of the braking apparatus.

A conduit 150a and small channels 160 distribute cooling oil to the brake assembly 26a and to the bearings 20a and 22a. In order to insure an unrestricted flow of cooling oil to the discs the coupling 40a is provided with a series of holes 41a. The lubricating and cooling oil is returned to the supply by a passageway communicating with the conduit 151a. The brake actuator 114a operates to compress the stack of discs 28a by means of pressure fluid which is admitted to the chamber 118a by a conduit 120a in substantially the same manner as provided in the preferred embodiment. Although not shown, return spring assemblies may be provided for releasing the brake actuator 114a from the plates 28a.

Thus, according to this invention, a braking apparatus is provided which facilitates maintenance and repair by virtue of locating the seals 94 and 94a (FIG. 2 and FIG. 4, respectively) outboard of the wheel bearings. Maintenance and repair of the braking apparatus of this invention is also facilitated by interconnecting the wheel hubs 18 and 18a to the disc brake assembly 26 by means of a spline connection which retains its location after the wheel hub is removed thus assisting in quick re-assembly of the braking apparatus. The preferred embodiment of this invention is designed to insure trouble-free operation over a long period of time by positively precluding the entrance of larger pieces of friction material detached from the discs into the area of the wheel hub bearings. This, as will be recalled, is accomplished by providing the annular restricted passageway 54 for lubricating oil.

We claim:

1. In an apparatus of the class described an elongate tubular support; a wheel supporting member rotatably mounted intermediate the ends of said tubular support; means at one end of said tubular support for imparting rotation to said wheel supporting member; means at the other end of said tubular support for retarding and stopping said wheel supporting member; said wheel supporting member, said rotation imparting means, and said retarding and stopping means being located in axial adjacency on said tubular support and being provided with spline connections for permitting assembly and disassembly thereof as separate units.

2. A braking apparatus comprising, a disc pack assembly, a wheel hub assembly, and a final drive transmission assembly, said assemblies being arranged in axial adjacency on a tubular axle housing and provided with contacting rotary seals between said assemblies, and inboard and outboard bearings rotatably mounting said wheel hub on said tubular axle housing, one of the said seals being an outboard seal located between said wheel hub and said final drive assemblies and axially outwardly of the outboard one of said bearings.

3. A braking apparatus comprising; a disc pack, a wheel hub, and a final drive transmission mounted in axial adjacency on an elongate axle housing; bearing means rotatably mounting said wheel hub on said axle housing; a splined brake hub axially slidably connected to said disc pack and to one end of said wheel hub permitting said wheel to be axially movable to effect assembly and disassembly of said wheel hub relative to said disc pack; an annular member defining a retaining means for holding said brake hub against axial movement when said wheel hub is being disassociated therefrom; said disc pack and said bearings being located in communicating chambers to which is circulated oil serving to cool said disc pack and lubricate said bearings; and means between said chambers for preventing the entrance of abrasive material to the bearing chamber.

4. A braking apparatus comprising, an elongate tubular axle housing, a chamber surrounding one end of said housing having a disc pack located therein; means for supplying cooling oil to said disc pack, a wheel hub rotatably mounted on said housing by at least two longitudinally spaced bearings, and a splined member operatively interconnecting said disc pack and said wheel hub, said splined member being formed to provide a restricted annular passageway through which the cooling oil passes before being distributed to such bearings in order to prevent particulate abrasive material from entering the bearings.

5. In an apparatus of the class described an elongate tubular support; a wheel supporting member rotatably mounted intermediate the ends of said tubular support;

means at one end of said tubular support for imparting rotation to said wheel supporting member; means at the other end of said tubular support for retarding and stopping said wheel supporting member; said wheel supporting member, said rotation imparting means, and said retarding and stopping means being located in axial adjacency on said tubular support and being provided with spline connections for permitting assembly and disassembly thereof as separate units; pressure fluid operated means for actuating said retarding and stopping means; conduit means for supplying pressure fluid to said fluid operated means; and a settling chamber in said conduit means for accumulating foreign material in order to prevent wear of said fluid operated means.

6. In an apparatus of the class described an elongate tubular support; a wheel supporting member rotatably mounted intermediate the ends of said support; means at one end of said tubular support for imparting rotation to said wheel supporting member; means at the other end of said tubular support for retarding and stopping said wheel supporting member; said wheel supporting member, said rotation imparting means, and said retarding and stopping means being located in axial adjacency on said tubular support and being provided with spline connections for permitting assembly and disassembly thereof as separate units; and means, including a piston and cylinder, movable in a direction by fluid pressure and in the opposite direction by a spring mechanism for actuating said retarding and stopping means; said spring mechanisms comprising a spring biased elongated rod releasably connected to said actuating means by a removable abutment captively disposed in a seat formed in said actuating means.

7. A braking apparatus comprising a disc brake assembly, a wheel hub, and a transmission assembly arranged on a common axis; said wheel hub being mounted for rotation between said assemblies; axially spaced bearing means, one of which is adjacent said transmission assembly, rotatably mounting said wheel hub; and axially spaced seal means providing sealing relation between said assemblies and said wheel hub; one of said seal means also being located adjacent said transmission assembly.

8. A braking apparatus comprising a disc pack, a wheel hub, and a final drive transmission mounted in axial adjacency on an elongate axle housing; bearing means rotatably mounting said wheel hub on said axle housing; spline means connecting said disc pack to said wheel hub; said disc pack and said bearings being located in communicating chambers to which is circulated oil serving to cool said disc pack and lubricate said bearings; and passageways in said spline means for freely and evenly distributing the cooling oil to the discs.

References Cited by the Examiner

UNITED STATES PATENTS 2,920,722   1/1960   Schjolin et al. _____ 188—18 X

MARK NEWMAN, *Primary Examiner.*

DAVID J. WILLIAMOWSKY, *Examiner.*

A. T. McKEON, *Assistant Examiner.*